Oct. 13, 1970  J. B. STEIDING ET AL  3,533,225
ENDLESS MONOFORM BELT

Filed Jan. 22, 1968  2 Sheets-Sheet 1

INVENTOR
JOHN B. STEIDING
JOHN A. CUPLER, II

BY *Colton + Stone*

ATTORNEYS

Oct. 13, 1970  J. B. STEIDING ET AL  3,533,225
ENDLESS MONOFORM BELT
Filed Jan. 22, 1968
2 Sheets-Sheet 2
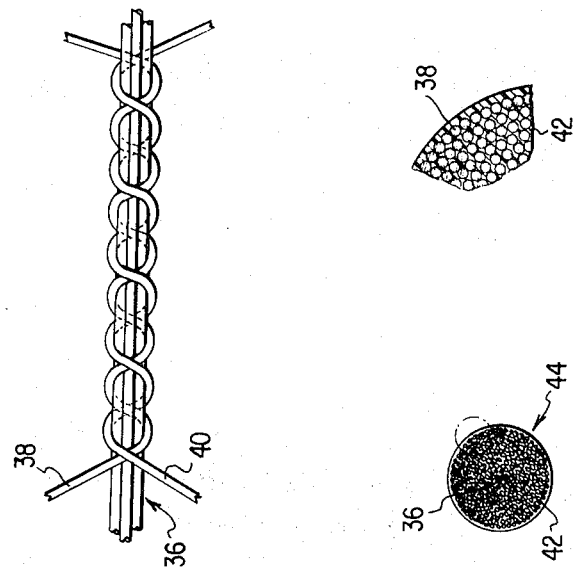
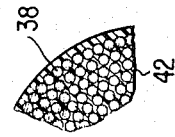
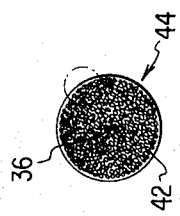
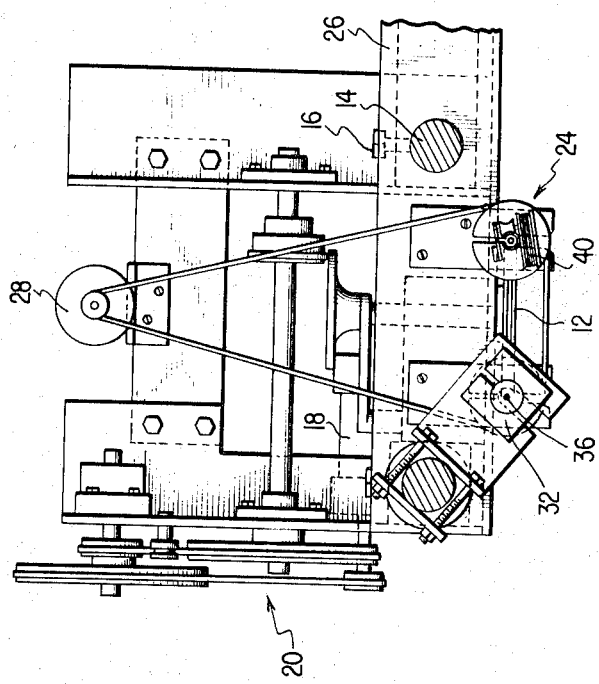
INVENTOR
JOHN B. STEIDING
JOHN A. CUPLER, II
BY  *Colton + Stone*
ATTORNEYS.

`United States Patent Office`

3,533,225
Patented Oct. 13, 1970

3,533,225
ENDLESS MONOFORM BELT
John B. Steiding, Midland, Md., and John A. Cupler II,
10 Cupler Drive-LaVale, Cumberland, Md. 21502;
said Steiding assignor to said Cupler
Filed Jan. 22, 1968, Ser. No. 699,683
Int. Cl. D02g *3/38, 3/44;* F16g *9/00*
U.S. Cl. 57—141                                    12 Claims

ABSTRACT OF THE DISCLOSURE

The disclosure is directed to an endless power transmitting belt that is virtually indestructible in normal usage and, in one form of the invention, possesses an excellent elastic memory. The belt consists of a central core surrounded by oppositely wound filamentary strands embedded in a cured settable material.

In a preferred form of the invention, the core is formed of from one to about ten parallel loops of a single extensible strand that is surrounded or encased by oppositely wound strands having a lesser linear extensibility than the core strands. The wound strands are embedded in an ambient settable resin whose internal bonding strength is greater than the bonding strength between the strands and resin.

BACKGROUND OF THE INVENTION

The invention relates to endless power transmission belts generally of the type disclosed in U.S. Pats. 145,386; 1,976,015; and 2,598,829. Although the power transmission belt herein disclosed has a wide variety of applications it is particularly adaptable for usage in modern dental equipment where conventional drive belts for high speed dental tools are particularly susceptible to wear and breakage. Additionally, the wear normally experienced by conventional belts results in the production of lint-like debris that is harmful to the machinery utilizing such belts.

One frequent cause of such breakage is the fact that most present day drive belts include a splice that not only causes a variation in the belt diameter with consequent vibration of the belt and associated machine elements but also provides a weak point in the belt that is prone to breakage. Even though the belt, itself, may be extensible the spliced joint is inextensible thus placing the joint under increased strain as compared to the rest of the belt.

Although both extensible and inextensible belts are presently used in many of the environments where usage of the novel belt herein disclosed is contemplated, conventional extensible belts lack perfect elastic memory and those that are inextensible require belt tighteners both of which factors militate against the maintenance of a prescribed belt tension which results in undue strain if the belt is too tight and slippage when the same is insufficiently tensioned. Both of these factors reduce belt life by contributing to early belt breakage in the former case and to belt wear in the latter.

An important factor relating to fatigue and shortened conventional belt life in general, is the internal friction that is set-up in a belt, moving around pulleys, due to the compression at the inner surface of the belt and tension on the outer surface. In the case of belts including strands embedded in and bonded to a plastic binder, both binder and strands are subject to fatigue.

SUMMARY OF THE INVENTION

It is a primary object of the invention to provide an endless power transmission belt that is of uniform diameter, virtually indestructible and possesses both excellent elastic memory and uniform extensibility.

It is among the further objects of the invention to provide an extensible belt at least some of whose component parts are extensible and so formed as to undergo relative movement whereby stresses within the belt are minimal and belt tighteners are not required.

A belt manufactured in accordance with the present invention not only includes component portions thereof that may undergo relative movement but, also, results in a belt of monoform construction that resists wear and the concomitant production of lint-like debris.

A critical factor contributing to the attainment of the foregoing advantages is the fact that the diameter of the belt core is extremely small as compared to the diameter of the finished belt. In a finished belt whose diameter is less than 60 thousandths of an inch, the core may consist of from one to about ten parallel loops of a single extensible 30 denier polypropylene strand. In the case of belts whose diameter is in excess of 60 thousandths of an inch the core may consist of a similar number of loops of a single extensible 160 denier polypropylene strand. The purpose of the core is merely to provide a form on which the oppositely wound strands and settable material may be applied. In view of the foregoing it will be apparent that it is quite feasible to use a single loop of a minute filamentary strand to provide the desired form though, in some cases, it may be desirable to form the core from several loops, such as three or four, to make the same more readily visible to an operator to facilitate certain manufacturing operations that may be performed manually as will become subsequently apparent.

The finished belt, in accordance with a preferred form of the invention, includes an extensible core of extremely small diameter lying along the central axis of the belt; at least two oppositely wound strands whose winding bias imparts extensibility to the same along the axis of the core; and an elasto-polymeric binder encasing the wound strands and core whose coefficient of extensibility is different from that of the wound strands. The internal bonding strength of the binder is greater than the bond between the strands and elasto-polymer. The inherent elasticity of the binder coupled with the winding bias of the wound strands provides a number of advantageous results not previously attainable with conventional belts. Firstly, the bond between the strands and binder is sufficiently strong that under moderate belt elongation there is little if any relative movement between the component parts of the belt. When, however, unusual stress conditions are present in the belt as in the case of maximum overall stretching or in passage around pulleys, the bond between the binder and wound strands may be broken at points of unusual stress permitting relative movement between the same whereby the strands may more readily accommodate the stress condition. For example, in passing around a pulley, the strand portions on the outside of the belt may move relative to the binder and, instantaneously, relieve the stresses therein while, simultaneously, taking up the compressing tendency on the strand portions on the inside surface of the belt which, of course, are removed from the strand portions on the outside of the belt by 180° of the respective helical wrap. Secondly, when a large stress, such as tension, is introduced uniformly along the axis of the belt all portions of the wound strands may move relative to the binder to, in effect, decrease their helical wrap angle which adds to the restoring force resulting from elongation of the binder. Thirdly, both belt strength and extensibility is derived from the binder and helically wrapped strands which permits the core to serve a completely different function than in the case of conventional belts, i.e. it serves merely as a winding form. Once the belt is formed, the core serves no substantial function and even if the core should be broken, as by forming the same of a strand whose linear extensibility is substantially less than that of the finished belt, the belt function would not be impaired. In actual practice, the core strand used has a greater extensibility than the finished belt and the same does not rupture in usage. The fact that the core has such a minimal cross-sectional dimension in comparison to the finished belt permits the belt to have a uniform diameter throughout which is substantially wholly composed of the wound strands and binder. Because the diameter of the strand used to form the core is so small, the fact that the two ends of the core strand must overlap at some point does not produce a bulge, or variant cross-sectional configuration, at any point in the belt. It will also be apparent that where, say for example, three loops of a 160 denier polypropylene strand is used as a core that the cross-sectional area of such core will be negligible when compared to the cross-sectional area of the finished belt having a diameter of, for example, $\frac{1}{32}$ of an inch. Accordingly, for a given belt, the cross-sectional area of the same consists of a far greater proportion of helical windings and binder than in the case of conventional belts.

In actual practice it has been found that nylon is particularly advantageous for use as the wrapping strands while Du Pont's Adiprene is the preferred elaso-polymeric binder. Although polypropylene, nylon and Adiprene have been mentioned for use as the core material, winding strands and binder, respectively, it is obvious that many other materials could be use to impart desired characteristics to the belt. For example, it has been found that when using Dacron for the winding strands, the wear resistance of the belt is increased although its strength is decreased.

The characteristics of the belt may also be altered, as desired, by varying the pitch of the helically wrapped strands. The extensibility of the belt is increased by increasing the number of wound turns per inch while the strength of the belt is decreased and, conversely, the strength is increased and extensibility decreased by decreasing the number of turns per inch.

The winding strands themselves may be inherently linearly extensible or inextensible, as desired. Thus when using inextensible winding strands, the extensibility of these strands in relation to the belt will be derived solely from their winding bias and when using linearly extensible strands, their inherent extensibility will supplement that imparted thereto by the winding bias.

In the case of extensible belts, it is particularly desirable to use wrapping strands which are relatively non-porous and whose surface exhibits a slick or smooth finish. Nylon is representative of strands of this type and these characteristics facilitate the relative movement between the strands and binder.

As will be apparent from the foregoing, it is also within the contemplation of the invention to construct inextensible belts by using an inelastic binder which is tightly bonded to the wrapped strands. In this latter case where wearability rather than extensibility is the desired objective, strand material such as Dacron exhibiting a porous or dull surface may be used which permits a much stronger bond between the binder and strands to resist relative movement.

DESCRIPTION OF THE DRAWINGS

The manner in which the foregoing and other objectives of the invention are achieved will become more apparent from the ensuing description when considered in conjunction with the drawings wherein:

FIG. 3 is a view taken along the lines 3—3 of FIG. 1;

FIG. 4 is a greatly exaggerated fragmentary schematic depiction of a portion of a partially formed belt as it would appear along the left-hand vertical run generally at the level of section line 3—3 of FIG. 1;

FIG. 5 is a cross-sectional view of a finished belt; and

FIG. 6 is a greatly enlarged fragmentary showing of the chain line encircled portion of FIG. 5.

DESCRIPTION OF THE PREFERRED EMBODIMENT

Figure 2:
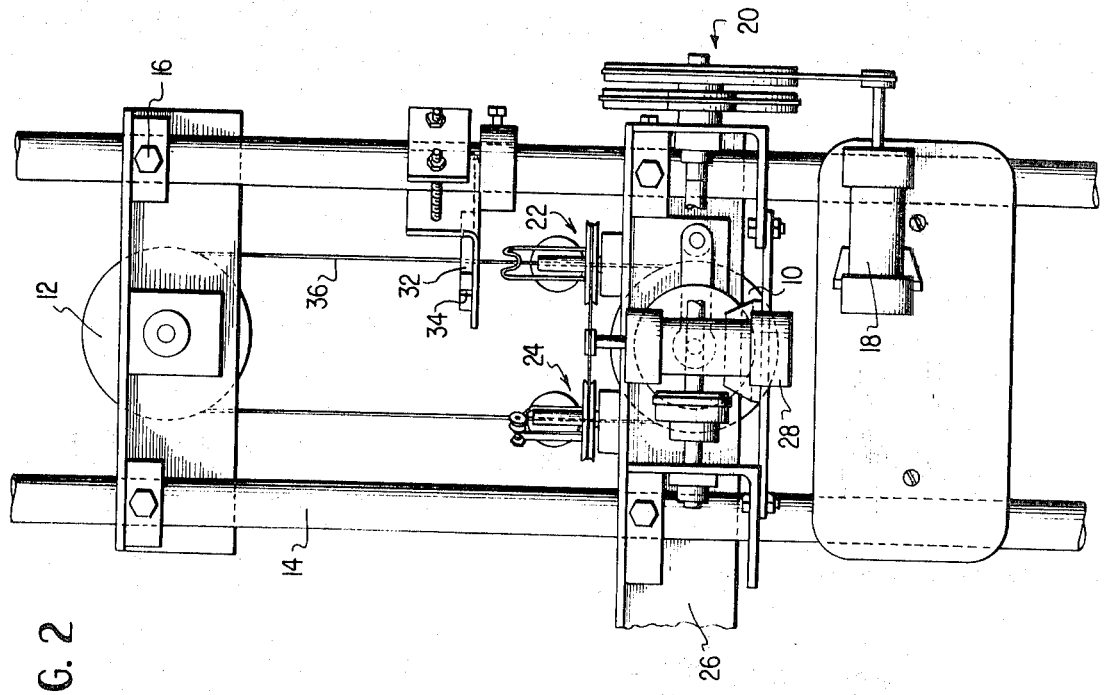
FIG. 2 is a rear elevational view of the apparatus shown in FIG. 1.
Figure 1:
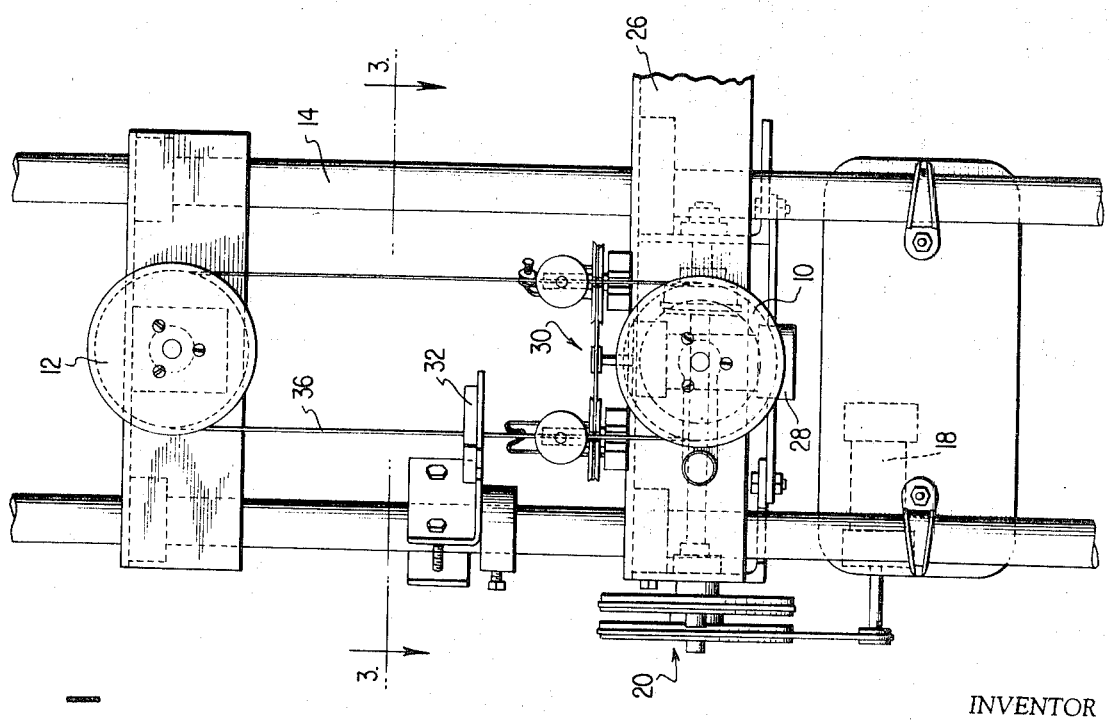
FIG. 1 is a front elevational view of one type machine that may be used to form the belt of the present invention showing a partially completed belt in the process of being manufactured.

A belt according to the present invention may be manufactured by the apparatus shown in FIGS. 1–3 which includes a pair of vertically spaced pulleys 10, 12 mounted for relative vertical adjustment along support rods 14 by adjusting means 16. Lower pulley 10 may be driven from variable speed electric motor 18 through any desired power transmission train 20. Conventional winding heads 22, 24 are so mounted on support member 26 as to have their central openings in alignment with the vertical runs of a strand loop extending between lower and upper pulleys 10, 12. A variable speed electric motor 28 may be provided to rotate winding heads 22, 24 through a conventional drive transmission 30 or, alternatively, separate variable speed motors may be used to rotate the heads independently and at different speeds.

Receptacle or fountain 32 is positioned in line with one of the vertical runs and has a slit 34 therein whereby the belt, in an early stage of manufacture, may be introduced into a central opening therein.

The first step in manufacturing a belt according to the invention is to provide a winding form 36 which subsequently becomes the belt core. This is accomplished by looping a very small strand over each of the pulleys and tacking the ends together such as by manually placing a small amount of the elastopolymer contained in the fountain 32 on the overlapped ends. One end of the strand of winding material 38, 40 contained on each of winding heads 22, 24 is then "tacked" to the winding form or core 36 and the driving pulley and winding heads are set in rotation.

Both winding heads 22, 24 rotate in the same direction and because the core is moving in different directions through the heads, the wrappings applied thereto will be wound in opposite directions as indicated in FIG. 4. As the core and wrapping strands move upwardly through fountain 32 they are coated with an elasto-polymer 42 that also fills the interstices formed by the winding strands over the previously applied polymer coating. The rotation of the drive pulley 10 and winding heads 22, 24 are continued until a belt 44 of the desired thickness has been formed.

The speed of drive pulley 10 and/or the speed of winding heads 22, 24 may be varied as desired to vary the number of turns per inch and/or the pitch of the windings applied to the belt to vary the characteristics of the belt, as previously described.

It will be apparent that, in the finished belt, each helically wrapped strand 38, 40 provides alternate wrappings extending radially outward from the core.

As previously pointed out virtually any filamentary material and/or settable plastic material may be used to form a belt in accordance with the invention. The binder used is preferably an ambient setting resin such as Du Pont's Adiprene so that the belt requires no special curing steps. The curing may however, if desired, be accelerated by exposure to a humid atmosphere at elevated temperatures below 100° C.

We claim:
1. An endless belt comprising; a central core surrounded by oppositely wound filamentary strands embedded within a plastic binder for movement relative thereto, a bond between said strands and binder that is of lesser strength than the internal bonding strength of said binder whereby under stress conditions portions of the bond between the binder and strands may be broken to facilitate said relative movement, and wherein said core has a cross-sectional dimension that is minimal relative to that of the belt such that the total cross-sectional area of the belt is comprised substantially completely of strands and binder.

2. The belt of claim 1 wherein said core consists of not more than ten parallel loops of a single strand.

3. The belt of claim 2 wherein said plastic binder is an elasto-polymer.

4. The belt of claim 3 wherein said wound strands are linearly-extensible.

5. The belt of claim 4 wherein said binder has a greater coefficient of extensibility than said wound strands.

6. The belt of claim 5 wherein said single strand forming said core has a greater coefficient of extensibility than said binder.

7. The belt of claim 2 wherein said core consists of a single complete loop of said single strand.

8. The belt of claim 2 wherein the single strand forming said core is polypropylene.

9. The belt of claim 2 wherein the surface of said wound strand is relatively hard and slick.

10. An endless belt comprising; a central core surrounded by oppositely wound filamentary strands embedded within a plastic binder, said core having a cross-sectional dimension that is minimal relative to that of the belt such that the total cross-sectional area of the belt is comprised substantially completely of strands and binder.

11. The belt of claim 9 wherein said belt has a finished diameter of less than $60 \times 10^{-3}$ inches and said core consists of not more than ten parallel loops of a single strand whose diameter does not exceed that of a 30 denier polypropylene strand.

12. The belt of claim 9 wherein said belt has a finished diameter of more than $60 \times 10^{-3}$ inches and said core consists of not more than ten parallel loops of a single strand whose diameter does not exceed that of a 160 denier polypropylene strand.

References Cited

UNITED STATES PATENTS

| | | | |
|---|---|---|---|
| 143,743 | 10/1873 | Bins | 57—141 |
| 2,598,829 | 6/1952 | Pollard | 57—141 |
| 2,755,214 | 7/1956 | Lyons et al. | 57—149 |
| 3,156,128 | 11/1964 | Williams | 74—232 |
| 3,243,338 | 3/1966 | Jackson | 161—176 |
| 3,365,872 | 1/1968 | Fields | 57—144 |
| 3,359,145 | 12/1967 | Salyer | 156—331 |

DONALD E. WATKINS, Primary Examiner

U.S. Cl. X.R.

74—238

UNITED STATES PATENT OFFICE
CERTIFICATE OF CORRECTION

Patent No. 3,533,225     Dated October 13, 1970

Inventor(s) John B. Steiding, John A. Cupler, II

It is certified that error appears in the above-identified patent and that said Letters Patent are hereby corrected as shown below:

Column 5, line 12: Change "linearly-extensible." to --linearly extensible.--

Column 6, line 3: Change "claim 9" to --claim 10--.

Column 6, line 8: Change "claim 9" to --claim 10--.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents